United States Patent [19]

Carlinsky et al.

[11] Patent Number: 5,647,693

[45] Date of Patent: Jul. 15, 1997

[54] FLOTATION SYSTEM FOR BUILDINGS

[76] Inventors: Herman Carlinsky, 95 Eagle Chase, Woodbury, N.Y. 11797; Raymond Ackley, P.O. Box 49, Sugar Loaf, N.Y. 10981

[21] Appl. No.: 374,867

[22] Filed: Jan. 19, 1995

[51] Int. Cl.$^6$ .................................................. E02D 27/32
[52] U.S. Cl. .................................................. 405/229; 52/169.9
[58] Field of Search ....................... 405/229, 249; 52/169.9, 292

[56] References Cited

U.S. PATENT DOCUMENTS

| | | |
|---|---|---|
| 2,189,486 | 2/1940 | D'Amico ................... 52/169.9 X |
| 2,429,381 | 3/1947 | Watson . |
| 2,715,756 | 8/1955 | Carver ........................ 405/229 |
| 3,166,037 | 1/1965 | Otis . |
| 3,630,161 | 12/1971 | Georgii . |
| 3,779,192 | 12/1973 | Gonzalez . |
| 4,070,979 | 1/1978 | Otis et al. . |
| 4,691,656 | 9/1987 | Katernberg et al. . |
| 5,083,404 | 1/1992 | Schulte . |
| 5,125,769 | 6/1992 | Lee et al. . |
| 5,131,109 | 7/1992 | Grip et al. . |
| 5,347,949 | 9/1994 | Winston ..................... 52/169.9 |

*Primary Examiner*—Tamara L. Graysay
*Assistant Examiner*—Frederick Lagman
*Attorney, Agent, or Firm*—Meltzer, Lippe, Goldstein, et al.

[57] ABSTRACT

A flotation system for a building is disclosed including a watertight basement having a unitary piece of concrete forming the floor and walls of the watertight basement. Rollers are attached to the watertight basement. As floodwater rises or recedes, the rollers roll along guide posts located near corners of the watertight basement. Attached to the guide posts are a ratchet system for moving the watertight basement along the guide posts and maintaining it at a desired height.

27 Claims, 15 Drawing Sheets

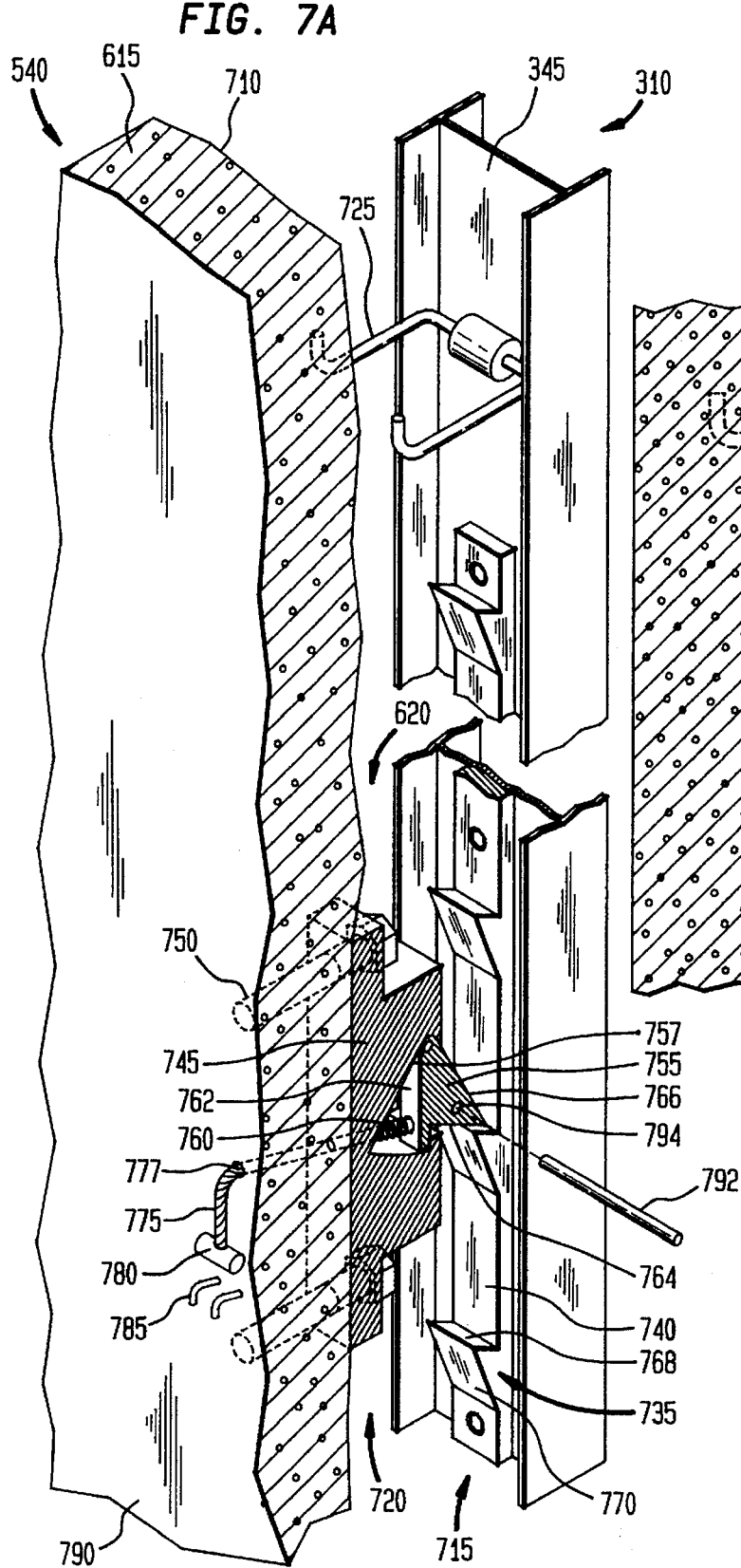
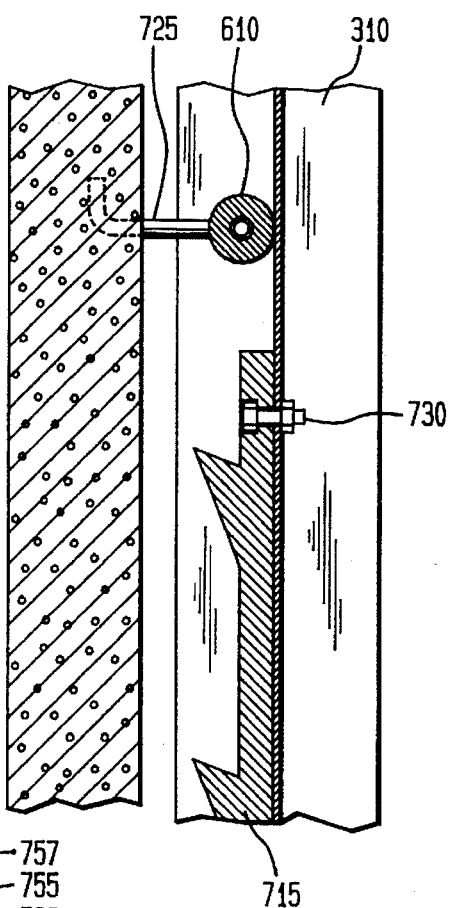

FLOTATION SYSTEM FOR BUILDINGS

FIELD OF THE INVENTION

The present invention relates to a floatation system for buildings located in flood plain areas. In particular, the invention relates to a building having a basement which floats along guide posts.

BACKGROUND OF THE INVENTION

Real estate near beaches or waterways has a special allure both for residential and commercial purposes. Waterfront property or property located near water is often in high demand for its aesthetic beauty and its many uses from recreation to farming. For example, a large tourist and recreation industry is often built near waterways. In addition, proximity to waterways provides many other advantages, such as convenient shipping and transportation. Most often, the most fertile farming areas are near waterways.

The natural beauty and the many uses of water resulted in constructing commercial and residential buildings near waterfronts. This trend shows no sign of slowing especially as the population grows and every piece of real estate is considered for development. However, real estate near waterways and low lying areas are prone to flooding which displaces people and disrupts businesses as the buildings become uninhabitable and suffer internal damage.

In flood plain areas, conventional buildings 100 are built on an elevated foundation 105 as shown in FIG. 1. Fixed piers 110 are used to permanently elevate the structure 115 to a predetermined height 120 above grade level 125. This allows for floodwater to pass under the structure 115 without actually flooding the structure 115 itself. This traditional flood plain construction is essentially that of a shore-based dock and has been used since early civilization without changes.

The fixed piers 110 are often covered with decorative skirting 130 to hide the relatively unsightly piers 110 and change the appearance of the elevated structure 115 to resemble a non-elevated structure. However, because these buildings are permanently elevated above grade level, it is necessary for visitors and inhabitants to use a large number of steps 135 to access the elevated structure 115. This is a great inconvenience not only to the general population, but also to the infirm, disabled or wheelchair bound.

Other techniques have been proposed for constructing buildings at grade level on dry land. One such technique is disclosed in U.S. Pat. No. 5,347,949, by inventor Paul K. Winston, of Englewood, Colo., hereinafter referred to as Winston. Winston discloses a prefabricated modular housing unit 200 for use in flood prone areas as shown in FIG. 2.

FIG. 2 shows the Winston housing unit 200 floating on floodwater 205. The housing unit 200 uses floatation elements 210 which are made of foam 215 contained in plastic liners 220. The floatation elements 210 are attached below the foundation 225 which is composed of perimeter wooden beams fastened to a conventional floor joist system.

The housing unit 200 is anchored to the building site through a series of extendable piers 230, in combination with a series of wooden pilings 240. The wooden pilings 240 serve as a fixed dry land foundation.

The Winston housing unit 200 is essentially a pontoon-like device wherein the housing unit 200 floats on the floatation elements 210. The Winston housing unit 200 suffers from a number of disadvantages. The extendable telescopic piers 230 are exposed even in the retracted position. Over time, the exposed portions of extendable telescopic piers 230 corrode. This inhibits extension of the telescopic piers 230. Additional corrosion occurs as floodwater rises and the telescopic piers 230 extend. Water even fills the extended telescopic piers 230 to provide a shock absorbing effect. This washes away any grease and further accelerates corrosion.

In addition, the Winston housing unit 200 is unstable when it floats and requires careful balancing of loads. On the heavy portion of the housing unit 200, larger foam floatation elements 210 are required. The load distribution in the housing unit 200 shifts as the house is furnished. To compensate for shifting loads, air bladders 250 at each corner of the housing unit 200 are required. The air bladders 250 are filled with proper amounts of air to provide a stable and level floatation. This is complex, inefficient and time consuming as it requires a compressor, a level and fine tuning (i.e., repeatedly inflating and deflating) each air bladder many times to achieve a level floatation. For example, inflating a first air bladder often requires re-adjusting the air in the remaining three air bladders 250, which in turn may necessitate further re-adjustment of the first air bladder.

Furthermore, due to a suction created by floodwater, the pontoon-like Winston housing unit 200 may never float. Due to flood and other concerns, the Winston housing unit 200 and conventional buildings near flood plain areas do not have basements extending below the grade level. Having a basement is a desirable feature in buildings yet lacking in conventional buildings near flood plain areas. Accordingly, it is an object of the present invention to overcome the disadvantages of the prior art. In particular, it is an object of the present invention to provide a floatable house without extendable posts thus eliminating greasing and extension failures of the posts. Another object of the present invention is to eliminate floatation elements and the need to balance them. It is yet another object of the present invention to provide a watertight basement which floats.

SUMMARY OF THE INVENTION

The present invention achieves these and other objects by providing a flotation system for a building comprising a watertight basement which floats due to rising floodwater. A building structure is mounted on the watertight basement. A plurality of guide posts guide a vertical movement (e.g., rise or fall with the floodwater) of the watertight basement. Illustratively, the guide posts are steel H-beams embedded in caissons located near the corners of the watertight basement.

In one embodiment, the flotation system has rollers attached to the watertight basement. The rollers may be rubber and roll along the guide posts during the vertical movement of the watertight basement. One end of each guide post is enclosed in the caisson which extends below the watertight basement. A second end of the guide post is enclosed within a wall of the building.

The watertight basement is constructed as a unitary piece of concrete using a single pour of cement from which the floor and the walls of the watertight basement are formed. Alternatively, two pours of cement are used. The first cement pour forms the floor. After the floor cement hardens, a second cement pour forms the walls. In this case, the floor and walls have mating keyways which provide a watertight connection between the walls and the floor.

In another embodiment, a ratchet is provided along each guide post to keep the watertight basement in an elevated position, for example, after the floodwater recedes. The ratchet has a movable tooth that passes freely up fixed teeth but engages the fixed teeth on its way down. This allows the watertight basement to rise with the floodwater, but prevents it from lowering after the floodwater recedes.

To allow the watertight basement to descend, the movable tooth is pulled back by a braided rope having one end attached to the movable tooth and another end going through a hole in the basement wall and terminating in a handle. The movable tooth may be locked in a recessed position by pulling and hooking the handle into a protrusion attached to the inner surface of the basement wall.

The floatable building further comprises a lifting rod for lifting. After the floodwater recedes and the floatable building remains raised (due to the engagement of the movable tooth with the fixed teeth of the ratchet), the floatable building is lifted from the lifting rod. This allows pulling back and disengaging the movable tooth of the ratchet from the fixed teeth so that the floatable building can be lowered.

The lifting rod has a lower portion embedded in the basement wall and terminates in a base plate extending into the basement floor. An upper portion of the lifting rod is located within a building wall, extends through the roof of the building and terminates in a top plate. The top plate has a hole for receiving a hook of a crane, for example, used for lifting the floatable building. The lifting rod may be steel and the upper portion extending through the roof, along with the top plate, may be galvanized.

In yet another embodiment, the flotation system further comprises a vacuum break system for breaking a vacuum created under the floor of the watertight basement by the rising floodwater. The vacuum break system, located on the floor of the watertight basement, is illustratively a $CO_2$ vacuum break system comprising a compressed $CO_2$ container. The container is connected to a valve which is in turn connected to a pipe. The pipe extends below the basement floor, so that when the valve is opened, the compressed $CO_2$ exits below the basement floor and breaks the vacuum.

Furthermore, the flotation system has a backup utility system located in the watertight basement, comprising a pump, a fresh water tank, a sewer holding tank, and a generator. The backup utility system is connected to existing utility connections of the floatable building after disconnecting the primary utility system coming from outside the floatable building.

In short, a flotation system for a building has a watertight basement with rollers and ratchets. The watertight basement vertically moves along guide posts located near its corners. One end of each guide post is enclosed in a caisson which extend below the watertight basement. A second end of the guide posts is enclosed within walls of the building.

Such a flotation system is simple, reliable and stable. Maintenance is greatly reduced by eliminating extendable posts which require grease and periodic upkeep. Having fixed guide posts not only simplify the flotation system but also provide a stable floatation, thus eliminating any special load balancing or floatation stabilizing elements. The added stability of the fixed guide posts also provides tornado protection. The watertight basement also provides a tornado-proof concrete shelter.

Furthermore, floatation elements are not needed, since the watertight basement floats like a barge, based on Archimedes principle. The floatable building floats because it displaces water having a weight greater than the weight of the floatable building itself.

Unlike prior art flotation systems, the inventive flotation system provides a watertight floating basement which is a desirable feature in buildings yet often eliminated in conventional buildings located in flood prone areas for fear of flooding. Furthermore, the watertight basement along with the structure supported thereon, resemble a conventional structure without unsightly piers. The inventive floatable building is not permanently elevated. Therefore, stairs and ramps are minimized providing a convenient access especially for the infirm.

BRIEF DESCRIPTION OF THE DRAWINGS

FIGS. 7a–7c illustrate the roller and ratchet in greater detail.

DETAILED DESCRIPTION OF PREFERRED EMBODIMENTS

Figure 1:
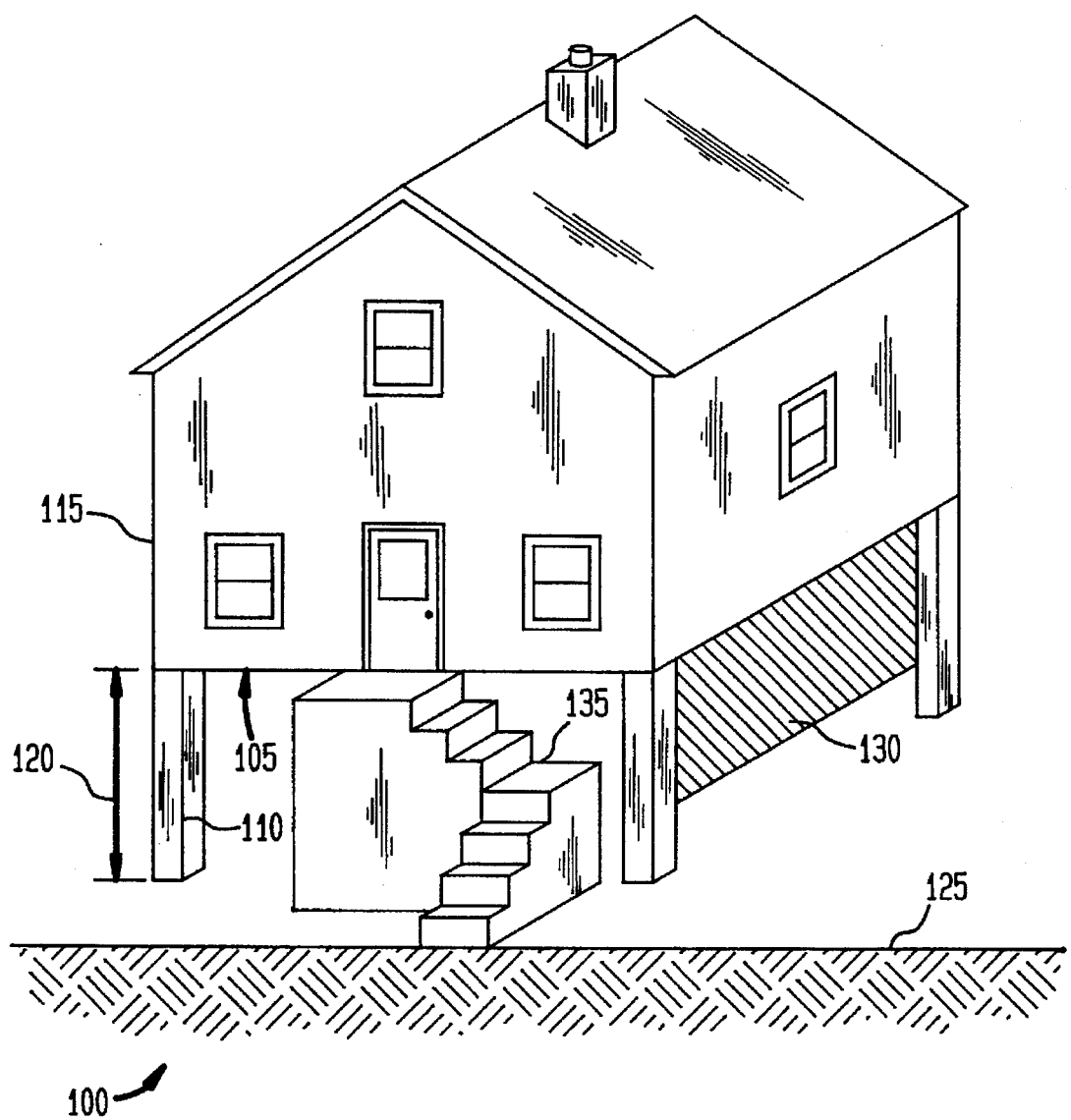
FIG. 1 illustrates a side elevation view of a conventional elevated building constructed on a flood plain.
Figure 2:
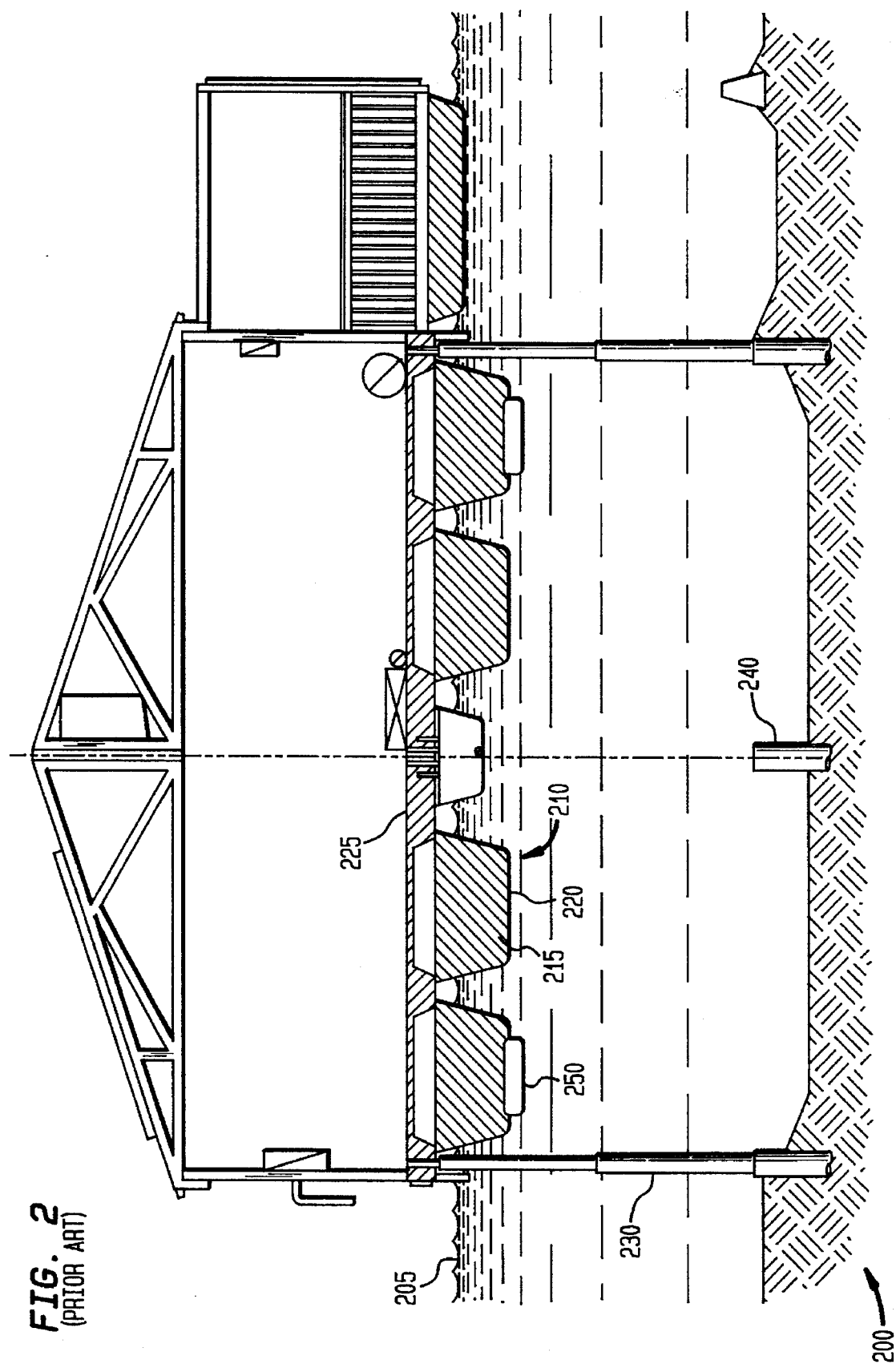
FIG. 2 illustrates a cross-sectional view of a prior art pontoon-like floating house.
Figure 3:
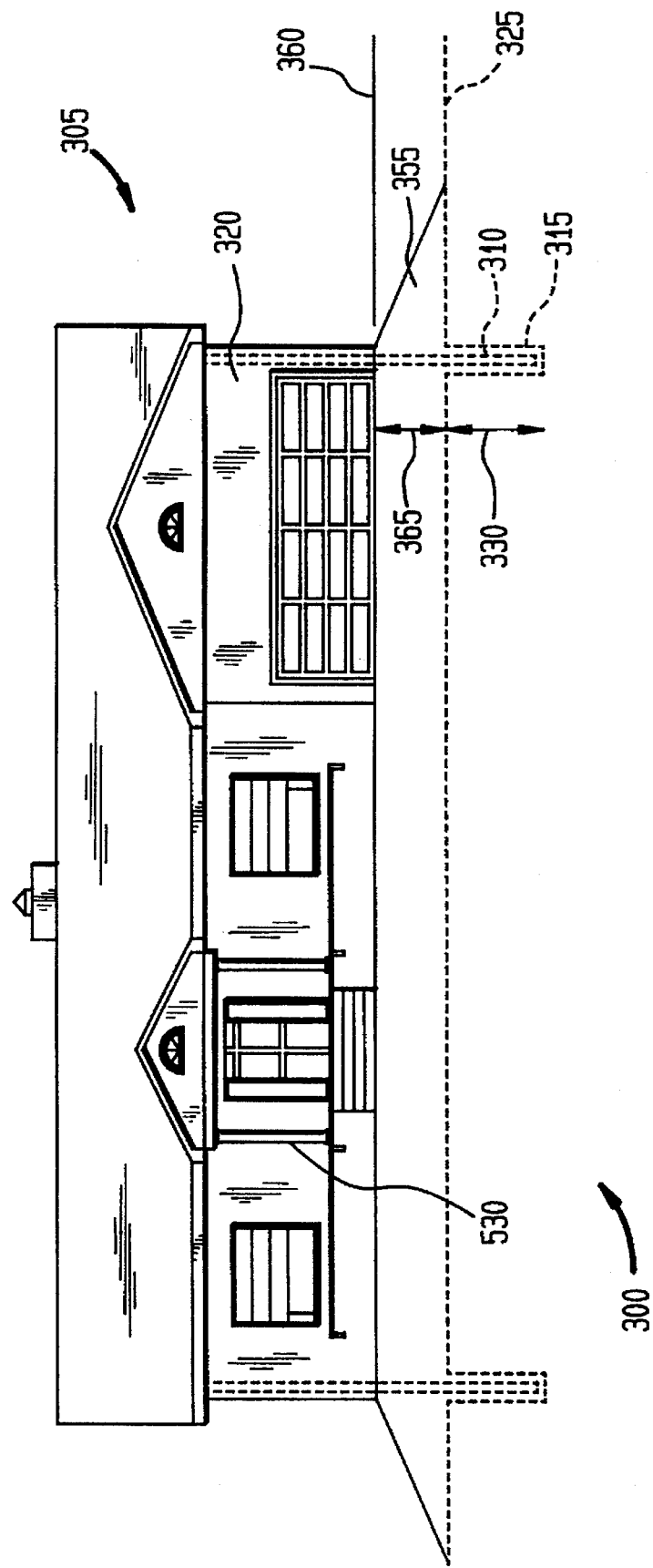
FIG. 3 illustrates a front end view of the floatable house according to the invention showing front caissons and guide posts.

According to one embodiment of the present invention, a floatable house 300 that has the appearance of a conventional house is depicted in FIG. 3. The floatable house 300 has a watertight basement (described below) supporting the house structure 305 thereon. The house structure 305 may be constructed on site, or may be a prefabricated modular design which is assembled on site. The floatable house 300 is built in a flood plain area and floats on the rising water level during a flood. The floatable house 300 is used as an illustrative example of the present invention which includes floatable buildings other than residential floatable houses, such as floatable commercial buildings.

Guide posts 310 are embedded in caissons 315 located near each corner of the floatable house 300. The guide posts 310 extend up the floatable house 300 between its inner walls and its siding 320. Illustratively, the siding 320 is a 6" wood lap siding.

The floatable house 300 has rollers (610 in FIG. 6) which roll along the guide posts 310 during a vertical movement of the floatable house 300, e.g., when the floatable house 300 rises and falls with the floodwater. FIG. 3 shows the two guide posts 310 located near the front corners of the floatable house 300. The guide posts 310 are anchored in the caissons 315. Illustratively, the caissons 315 are concrete caissons made by pouring cement into cylindrical sona tubes made of waterproof cardboard which act as a mold and disintegrate over time.

Figure 4:
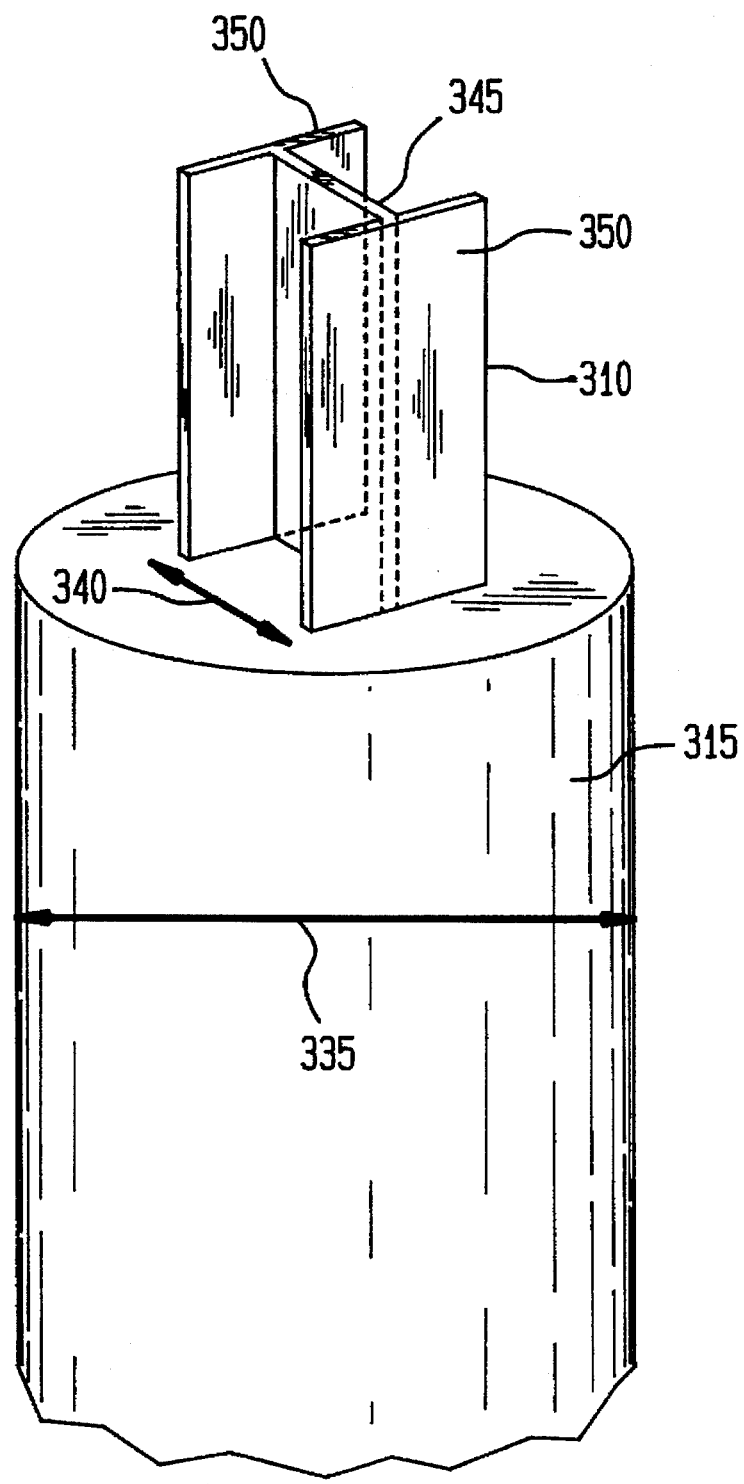
FIG. 4 illustrates a caisson and a guide post for the inventive floatable house in greater detail.

The caissons 315 begin at the existing grade level 325 and extend below ground a distance 330 dictated by the soil density and size/weight of the floating house 300. Preferably, the distance 330 is at least 8 feet below the existing grade level 325. The soil and house size specifications also dictate the size of the caissons 315 and the guide posts 310. Referring to FIG. 4, the diameter 335 of the caissons 315 is preferably twice the dimension 340 of the larger section 345 of the guide posts 310. The larger section 345 is between the two shorter sections 330. Illustratively, the guide posts 310 are 4"×8" steel H-beams and the diameter 335 of the caissons 315 is 16", being twice the 8" dimension of the guide post 310.

Referring once again to FIG. 3, the front portion of the floatable house 300 is graded with back fill 355 to provide a finished grade 360 which slopes away from the floatable house 300. This keeps water, e.g., rain water, away from the front of the floatable house 300. The back fill 355 may be sand, soil, gravel or other suitable material.

The guide posts 310 project upwardly from the caissons 315. The guide posts 310 located at the front portion of the floatable house 300, have an exposed portion 365 surrounded by the back fill 355. The exposed portion 365, which is between the front two caissons 315 and the finished grade 360, is galvanized to prevent corrosion. Advantageously, as shown in FIG 5, the guide posts 310 located near the back corners 510 of the floatable house 300 do not have any exposed portions.

The floatable house 300 resembles a conventional house. The floatable house 300 has many of the amenities present in conventional houses. For example, a cutaway view of the floatable house 300 of FIG. 5 shows a ramp 512 at the front 515 of the floatable house 300 which slopes away from the house 300. One end 517 of the ramp 512 is at the same level as the garage floor 520. Illustratively, the house 300 has a front and back porch 522, 524 which are surrounded by handrails 526, 528 which may be wrought iron or wood handrails. Wood columns 530 extend from a cantilevered platform 532 of the front porch 522 to the porch roof 534.

Figure 5:
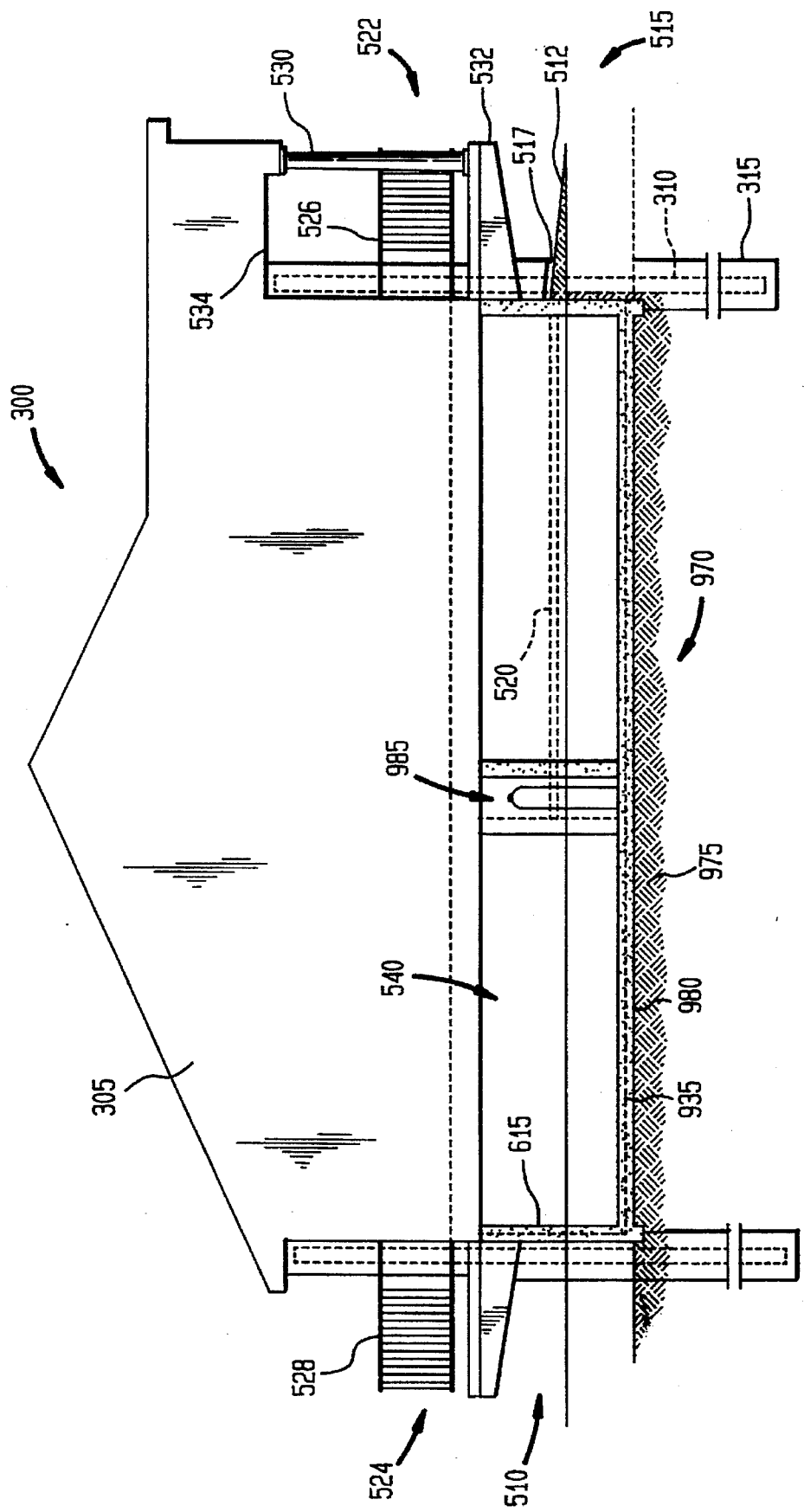
FIG. 5 illustrates a cutaway side elevation view of the floatable house according to the invention.

FIG. 5 also shows a cutaway view of a watertight basement 540 which floats in a manner similar to a barge. When floating, the floatable house 300 displaces a body of water having a weight which is greater than the weight of the floatable house 300 itself. Therefore, based on Archimedes principle, the floatable house 300 floats. The front 515 of the floatable house 300 is shown in greater detail in FIG. 6.

Figure 6:
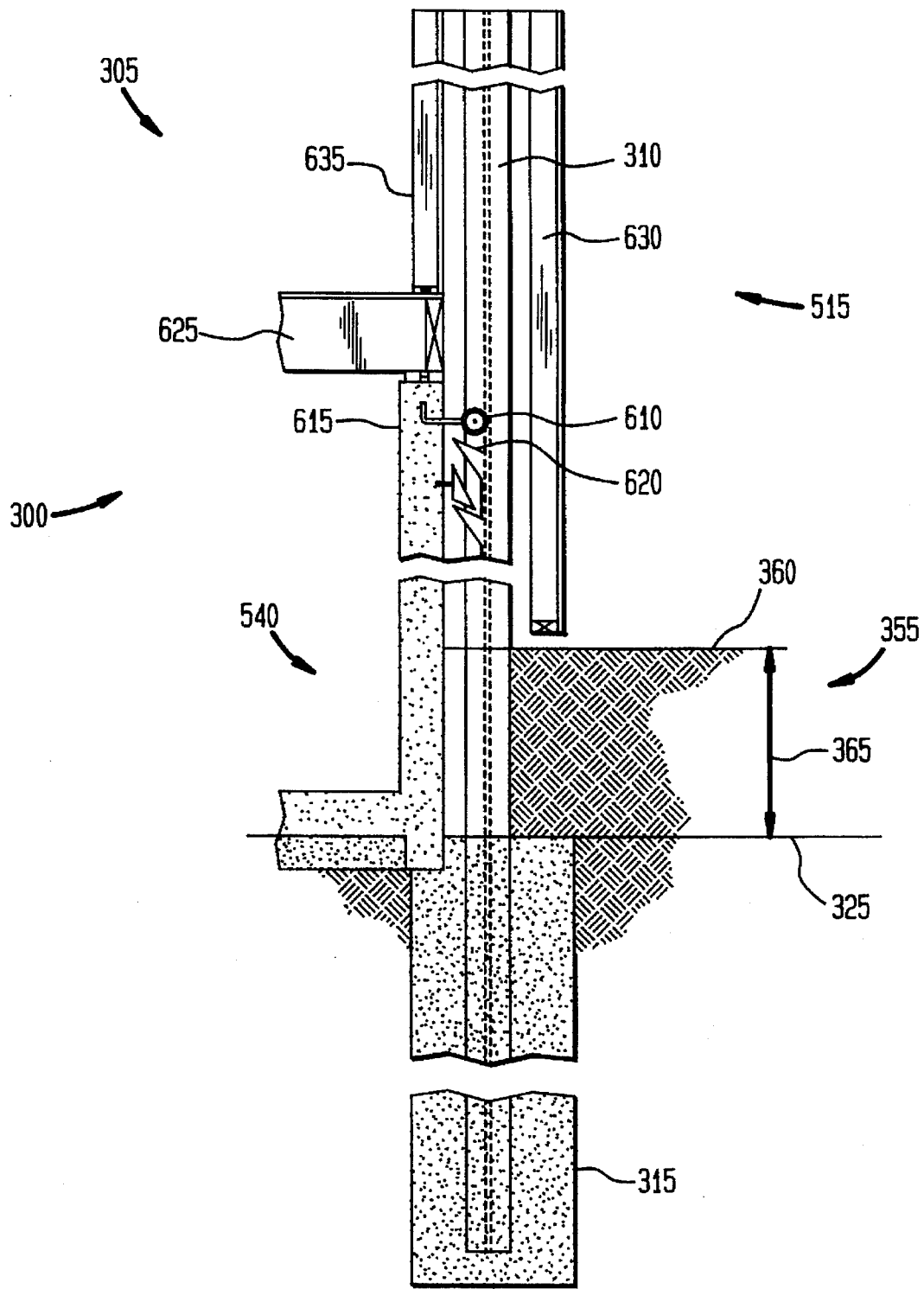
FIG. 6 illustrates a cutaway side elevation view of a caisson, a guide post, a roller and a ratchet of the inventive floatable house.

FIG. 6 shows a cylindrical roller 610 anchored in the concrete walls 615 of the watertight basement 540. The roller 610 rolls along the guide post 310. The roller 610 rolls along the wide section 425 (FIG. 4) of the guide post 310.

Below the roller 610, a (schematically shown) ratchet 620 is located between the wall 615 of the watertight basement 540 and the guide post 310. The ratchet 620 allows the watertight basement 540 to freely rise along the guide posts 310 as the floodwater rises. However, the ratchet 620 prevents a lowering of the watertight basement 540 when the floodwater recedes. It is desirable to keep the watertight basement 540 raised after the floodwater recedes in order to clean any debris collected on the site below the watertight basement 540 and adequately prepare the site before lowering the watertight basement 540.

Near each corner of the floatable house 300, the guide posts 310 extend along both the watertight basement 540 and the house structure 305 supported thereon. The guide post 310 extends from the caisson 315 which is below the existing grade 325. Earth fill 355 is used in the front portion of the floatable house 300 to create a finished grade 360.

From the caisson 315 to the floor joist 625 of the floatable house 300, the guide post 310 extends outside the wall 615 of the watertight basement 540 near a corner of the floatable house 300. Above the finished grade 360, the guide post 310 extends into the house structure 305. Between the finished grade 360 and the floor joist 625, the guide post 310 is between the concrete wall 615 of the watertight basement 540 and the outer wall 630 of the floatable house 300. The floor joists 625 of the floatable house 300 rest on the concrete walls 615 of the watertight basement 540.

Above the floor joist 625 of the floatable house 300, the guide post 310 is between the inner wall 635 and the outer wall 630 of the floatable house 300. Illustratively, the guide post 310 is approximately 3" away from the wall 615 of the watertight basement 540 and the inner wall 635 of the floatable house 300.

Figure 7C:
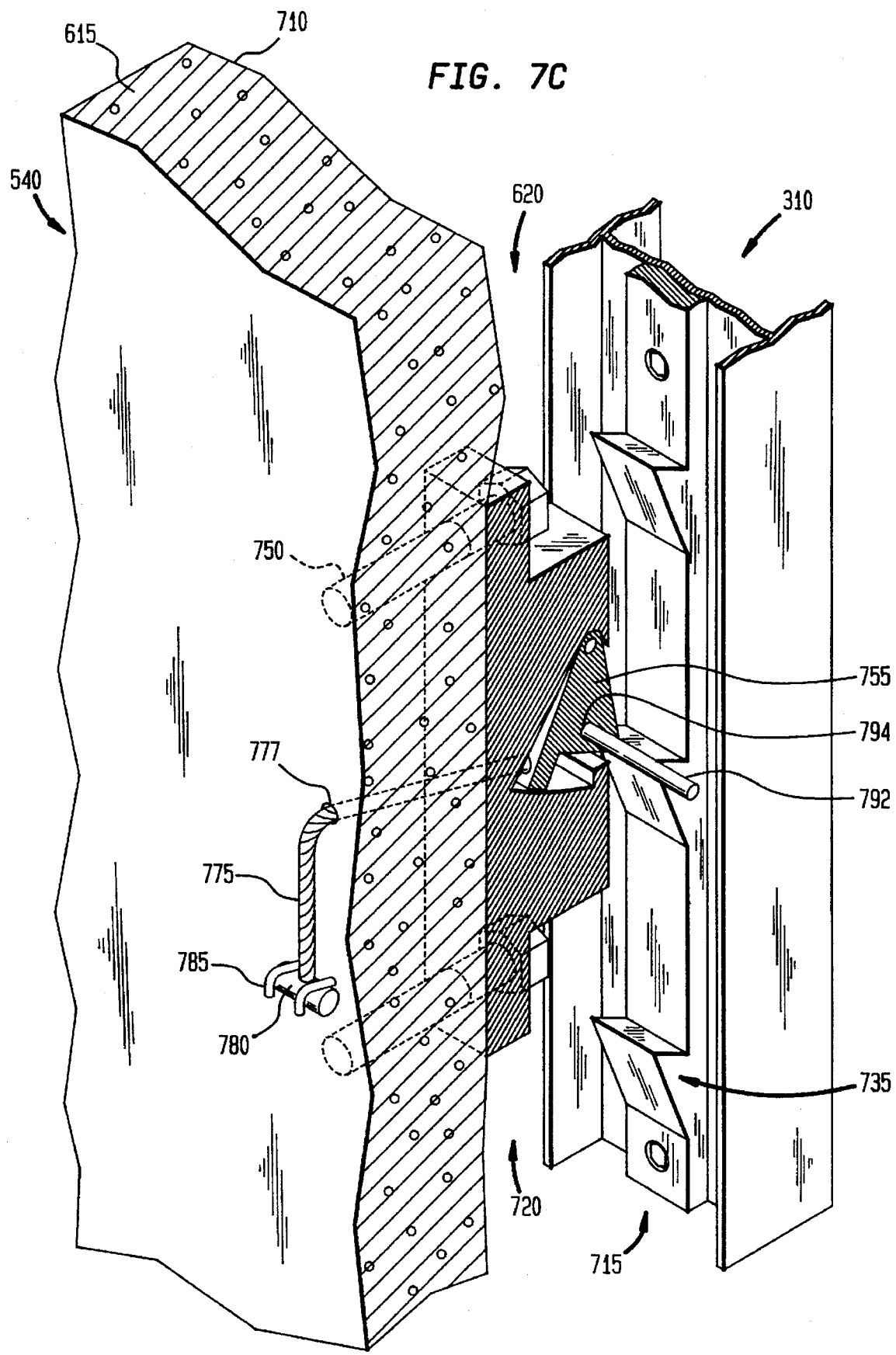

FIGS. 7a–7c show the roller 610 and the ratchet 620 in greater detail. The roller 610 is attached to the outer surface 710 of the wall 615 of the watertight basement 540. The ratchet 620 has two parts 715, 720. The first part 715 is attached to the guide post 310 and the second part 720 is attached to the outer surface 710 of the wall 615. Each guide post 310, located near each corner of the watertight basement 540, and the corresponding watertight basement wall 615 have their own ratchet 620 and roller 610.

The roller 610 rolls along the larger section 345 of the guide post 310. The roller 640 may be bolted or anchored into the wall 615 of the watertight basement 540 using bolts, two J-hooks or a single U-shaped J-hook 725. The roller 610 may be rubber, teflon, hard plastic or rubberized metal. Illustratively, the roller 610 is located above the ratchet 620 as shown in FIGS. 7a–7c. Alternatively, the roller 610 may be located adjacent to the ratchet 620. This allows the first part 715 of the ratchet 620 to extend further up the guide post 310 thus permitting the watertight basement 540 to remain locked in place at a higher height. The ratchet 620 keeps the watertight basement 540 in an elevated position after floodwater recedes or after the watertight basement 540 has been raised by hydraulic jacks or cranes.

The first part 715 of the ratchet 620 is attached, e.g., bolted with bolts 730 shown in FIG. 7b, to the guide post 310. The first part 715 has fixed teeth 735 separated by segments 740. The second part 720 of the ratchet 620 has a body 745 which is attached e.g., bolted, to the outer surface 710 of the wall 615 with bolts 750. In addition, the second part 720 has a movable tooth 755 which is attached to the body 745 via a hinge 757 located at the top of the movable tooth 755. The fixed teeth 735 mate with the movable tooth 755 of the second part 720 to prevent a lowering of the watertight basement 540.

The movable tooth 755 of the second part 720 is pushed forward by a spring loaded rod 760 attached to the back 762 of the movable tooth 755. Surfaces 764, 766 of the movable tooth 755 and surfaces 768, 770 of the fixed teeth 735 of the first part 715 complement each other so as to allow the watertight basement 540 to rise but prevent it from descending. Preferably, the surface 764 of the movable tooth 755 has a downward slant and the surfaces 768 of the fixed teeth 735 have an upward slant. This provides a better locking to prevent the lowering of the watertight basement 540 when the surface 764 of the movable tooth 755 mates with the surface 768 of a fixed tooth 735.

The operation of the floatable house 300 is as follows. When the floodwater rises, the rollers 610 roll along the guide posts 310 as the watertight basement 540 rises. When the watertight basement 540 rises, the movable tooth 755 is pushed back toward the wall 615 as it slides up the fixed teeth 735. When the movable tooth 755 reaches over one of the fixed teeth 735, the spring loaded rod 760 pushes the movable tooth 755 forward toward the guide post 310. This extends the movable tooth 755 over the fixed tooth 735 and prevents lowering of the watertight basement 540.

In order to allow a lowering of the watertight basement 540, the movable tooth 755 is manually pulled back and locked in a recessed position as shown in FIG. 7c. Illustratively, a braided rope 775, which may be metal, has one end attached to the spring loaded rod 760.

Another end of the braided rope 775 passes through a hole 777 in the wall 615, enters the watertight basement 540 and terminates by a handle 780. Alternatively, the spring loaded rod 760 can be dispensed with and the braided rope 775 is directly attached to the movable tooth 755. In this case, instead of the spring being coiled around the rod 760, it is coiled around a portion of the braided rope 775 which is between the outer surface 710 of the wall 615 and the movable tooth 755. The spring, whether it is coiled around the braided rope 775 or the rod 760 has a diameter larger than the diameter of the hole 777 that the braided rope 775 and the rod 760 pass through. This keeps the spring between the outer surface 710 of the wall 615 and the movable tooth 755. Alternatively, or in addition to the spring, the hinge 757 of the movable tooth 755 may be spring loaded to bias the movable tooth 755 in the forward direction toward the guide post 310.

The movable tooth 755 is recessed back by pulling on the handle 780. To lock the movable tooth 755 in a recessed position, the handle 780 is be hooked onto protrusions 785 attached to the inner surface 790 of the wall 615 as shown in FIG. 7c.

In addition, a safety pin 792 may be inserted in a hole 794 on the side of the movable tooth 755. A fixed plate (not shown), having a hole, is located at the other side of the movable tooth 755. The inserted safety pin 792 also enters the hole in the fixed plate thus locking the movable tooth 755 in a recessed position. In this recessed position of the movable tooth 755, the watertight basement 540 can freely slide down the guide posts 310.

The movable tooth 755 may be pulled back easily when it is located along the segments 764 between two of the fixed teeth 735. However, pulling back the movable tooth 755 is nearly impossible when it is resting on the fixed tooth 735, supporting the weight of the watertight basement 540 and preventing it from lowering. Therefore, to be able to pull back the movable tooth 755 while it is supporting the weight of the floatable house 300, it is necessary to lift the floatable house 300. This removes the weight of the floatable house 300 from the movable tooth 755 so that it may be pulled back to the recessed position shown in FIG. 7c. The floatable house 300 may be lifted using hydraulic floor jacks, similar to lifting a car. This is the primary method for lifting the floatable house 300 since it is simple and cost effective. The floatable house 300 need only be lifted approximately ¼" in order to release the engagement of the movable tooth 755 into the fixed teeth 735. A secondary method for lifting the floatable house 300 may be used. In this case, the floatable house may be lifted using a crane hooked to top plates 810 connected to lifting rods 815 as shown in FIGS. 8–9.

Figure 8:
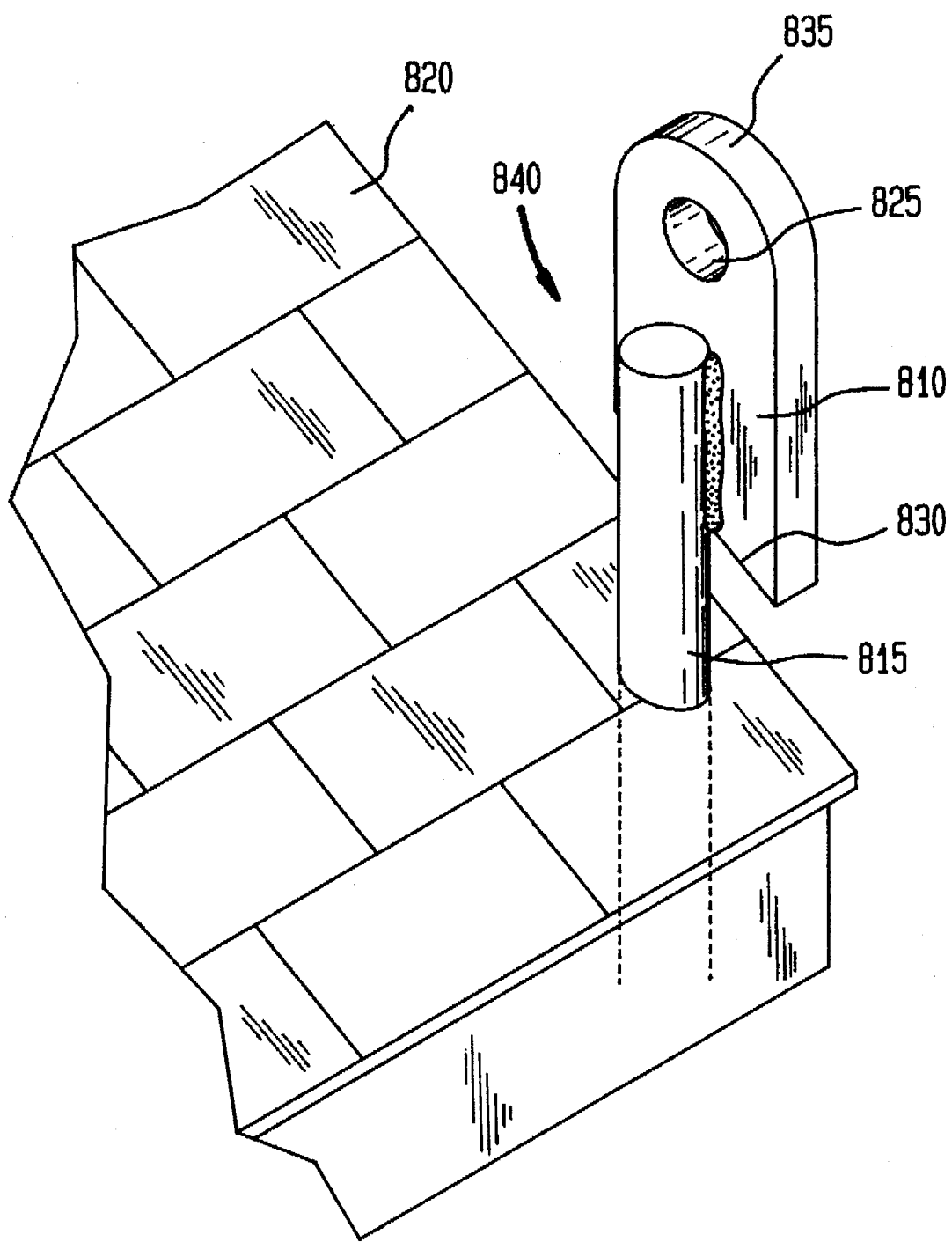
FIG. 8 illustrates an elevation view of a lifting rod and a top plate extending above the roof of the inventive floatable house.

FIG. 8 shows the top plate 810 attached, e.g., welded, to the lifting rod 815 just above the roof 820. The top plate 810 has a hole 825 therethrough so that a hook of a crane may be attached to lift the floatable house 300. Illustratively, the hole 825 has a 3 inch diameter and the top plate 810 is a steel plate having a width of 6 inches, a length of 11 inches and a thickness of ¾ inches (6"×11"×¾"). The top plate 810 may have a lower sloping edge 830 to match the slope of the roof 820. The top 835 of the top plate 810 may be curved to eliminate sharp edges.

Illustratively, the lifting rod 815 is steel having a diameter of 1 and ¾ inches (1¾"). The exposed end 840 of the lifting rod 815 above the roof 820, and the top plate 810 are galvanized to prevent corrosion. The lifting rods 815 may be located near the corners of the floatable house 300. Additional lifting rods 815 may also be added between the corner of the house depending on the size and shape of the floatable house 300. For example, eight lifting rods 815 are used for a 30'×60' house.

Figure 9:
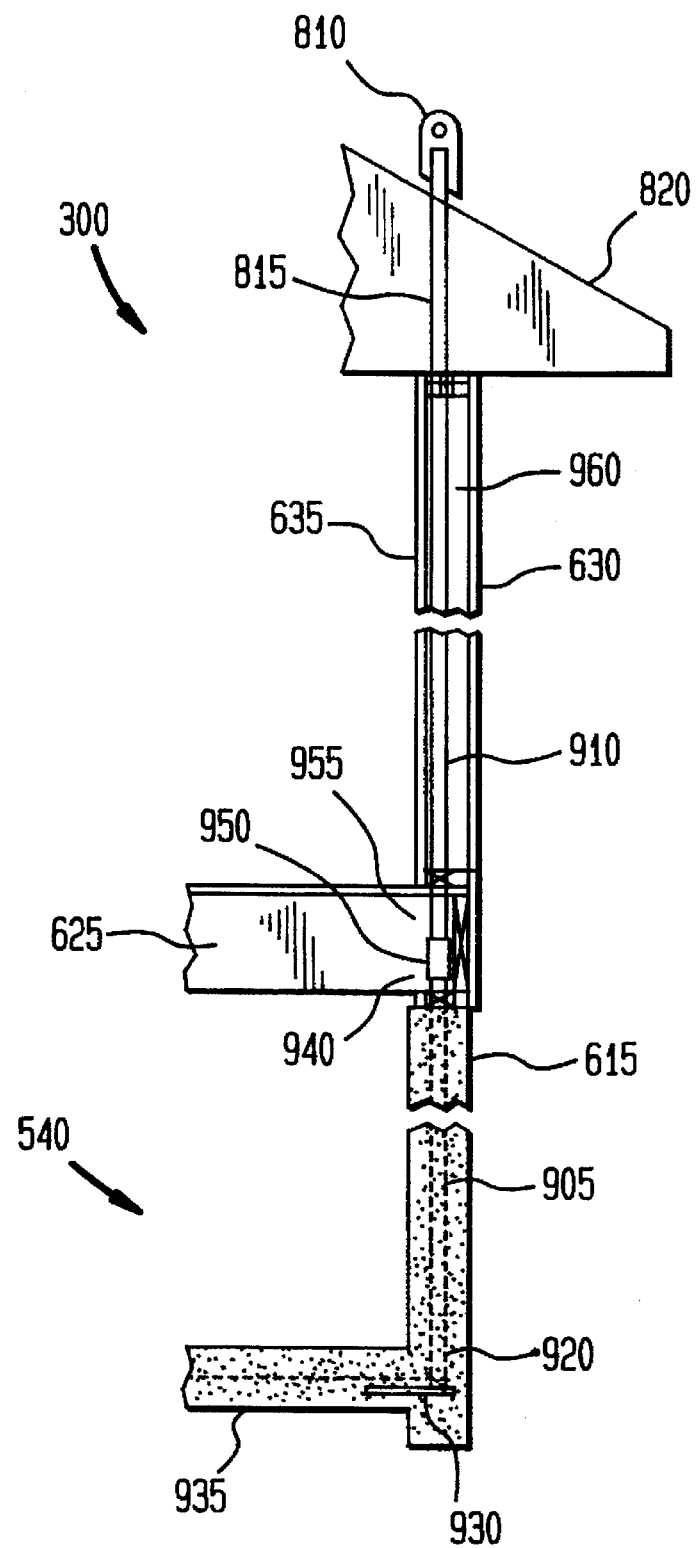
FIG. 9 illustrates a cutaway side elevation view of the lifting rod of the floatable house according to the invention.

FIG. 9 shows a cross section of the floatable house 300 with the lifting rod 815 and the top plate 810 extending above the roof 820. Illustratively, the lifting rod 815 is made of two sections 905, 910. The first section 905 is within the wall 615 of the watertight basement 540. One end 920 of the first section 905 is attached, e.g., welded, to a base plate 930. Illustratively, the base plate 930 is steel and has a size of 6"×11"×¾" similar to the top plate 810. The base plate 930 is perpendicularly attached to the end 920 of the first lifting rod section 905 and extends into the floor 935 of the watertight basement 540. The first lifting rod section 905 and the attached base plate 930 are embedded into the concrete wall 615 and floor 935 of the watertight basement 540. This is accomplished by placing the first lifting rod section 905 and the attached base plate 930 in a mold of the watertight basement 540 and thereafter pouring cement into the mold to form the watertight basement 540.

A second end 940 of the first lifting rod section 905 is threaded and protrudes from the wall 615 of the watertight basement 540 between the floor joists 625. A coupling 950 connects the threaded end 940 of the first lifting rod section 905 to a threaded end 955 of the second lifting rod section 910. The second section 910 extends through the wall (between the outer wall 630 and the inner wall 635) of the floatable house 300, between the wall studs 960, e.g., 2"×6" studs, traverses the roof 820 and terminates with the top plate 810. Thus, the base plate 930, the top plate 810 and the lifting rod 815, provide a means for lifting the floatable house 300.

Returning to FIG. 5, before constructing the watertight basement 540 the site is prepared as follows. In the area 970 where the watertight basement 540 is to be poured, a few inches of soil is first removed. Thereafter, the remaining soil 975 on the area 970 is well compacted and covered with porous gravel fill which is also compacted to provide 3" to 4" of shoulder stones 980. The shoulder stones 980 prevent water accumulation below the floor 935 of the watertight basement 540 and allow transmittal of air between the stones 980. This prevents the formation of mud and vacuum below the floor 935.

Because the shoulder stones 980 allow transmittal of air, they prevent a suction effect of the floodwater which might hinder the floatation of the watertight basement 540. In case vacuum or suction is created under the floor 935 of the watertight basement 540 by the floodwater, a vacuum break system 985 is provided. The vacuum break system 985 breaks the vacuum created under the floor 935 by the rising floodwater and provides a boost to the watertight basement 540.

Figure 10:
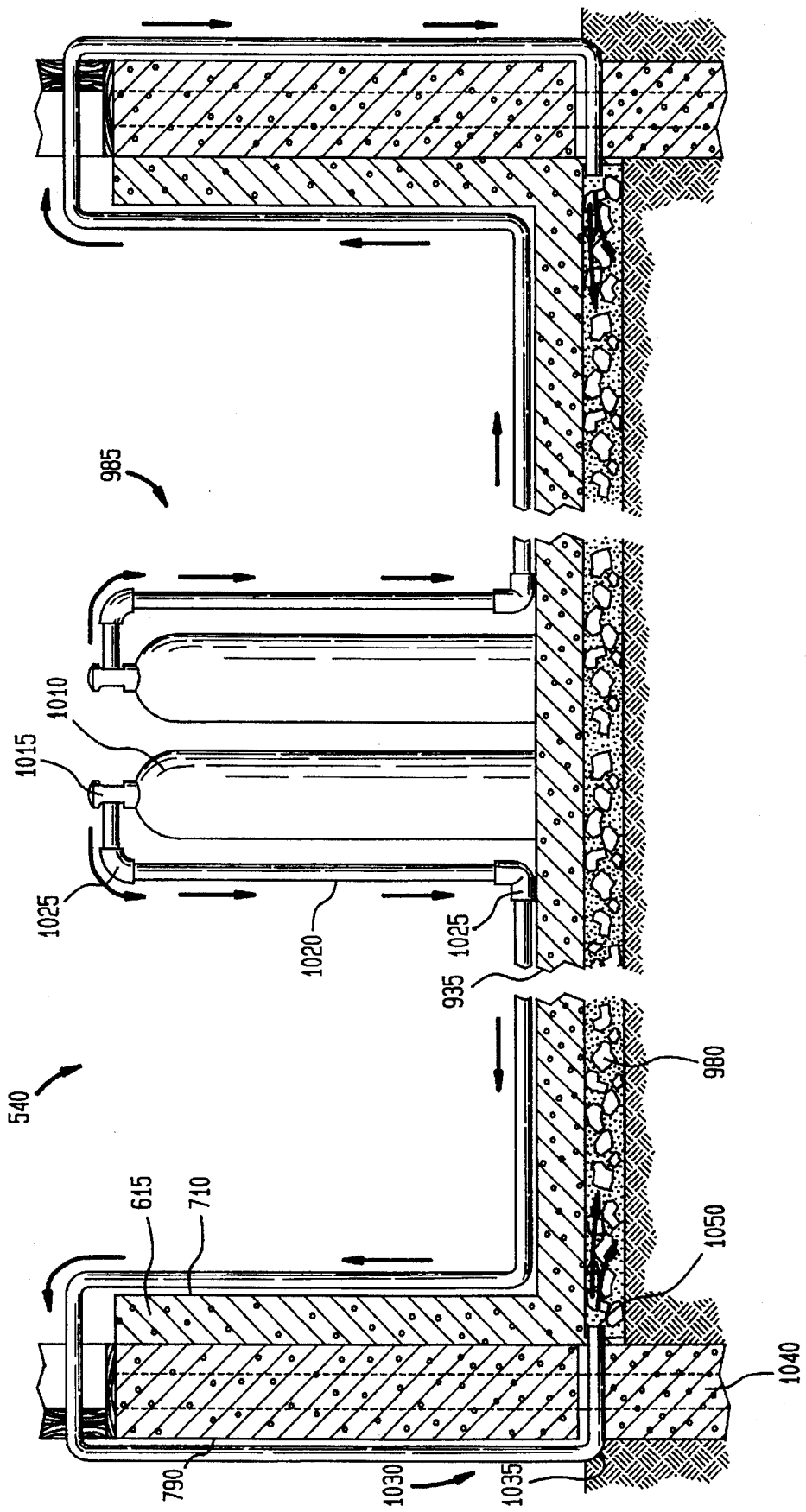
FIG. 10 illustrates a cross-sectional view of the watertight basement and a vacuum breaker system according to the invention.

FIG. 10 shows the vacuum break system 985 in greater detail. The vacuum break system 985 comprises a container 1010 located on the floor 935 of the watertight basement 540. Illustratively, the container 1010 contains compressed $CO_2$. More than one container 1010 may be used, depending on the size of the floatable house 300 and the soil characteristics. Two containers 1010 are shown in FIG. 10. Each container 1010 has a valve 1015 connected to a series of pipes 1020. The pipes 1020 are interconnected with couplings 1025.

The pipes 1020 traverse down the container 1010, along the floor 935, up the inner surface 710 of the wall 615, over the wall 615 and down the outer surface 790 of the wall 615. Alternatively, the container 1010 is located near the wall 615. This alleviates the need for the pipes 1020 to travel along the floor 935 to reach the wall 615.

On the bottom outer surface 1030 of the wall 615, the pipe 1020 goes through a hole 1035 in the retainer skin 1040. The retainer skin 1040 is the portion of the wall 615 located below the floor 935. Thus, the pipe 1020 extends below the floor 935 into the shoulder stones 980 located between the floor 935 the soil 975. The pipe 1020 located in the shoulder stones 980 may be terminated in a nozzle 1050.

When the rising floodwater causes a suction effect on the watertight basement 540 which hinders its rise, the valve 1015 of the container 1010 is opened allowing the compressed $CO_2$ to escape. The escaping compressed $CO_2$ neutralizes the suction of the floodwater and provides a boost to the watertight basement 540. Thus, the watertight basement 540 begins to float and rises with the floodwater.

Figure 11:
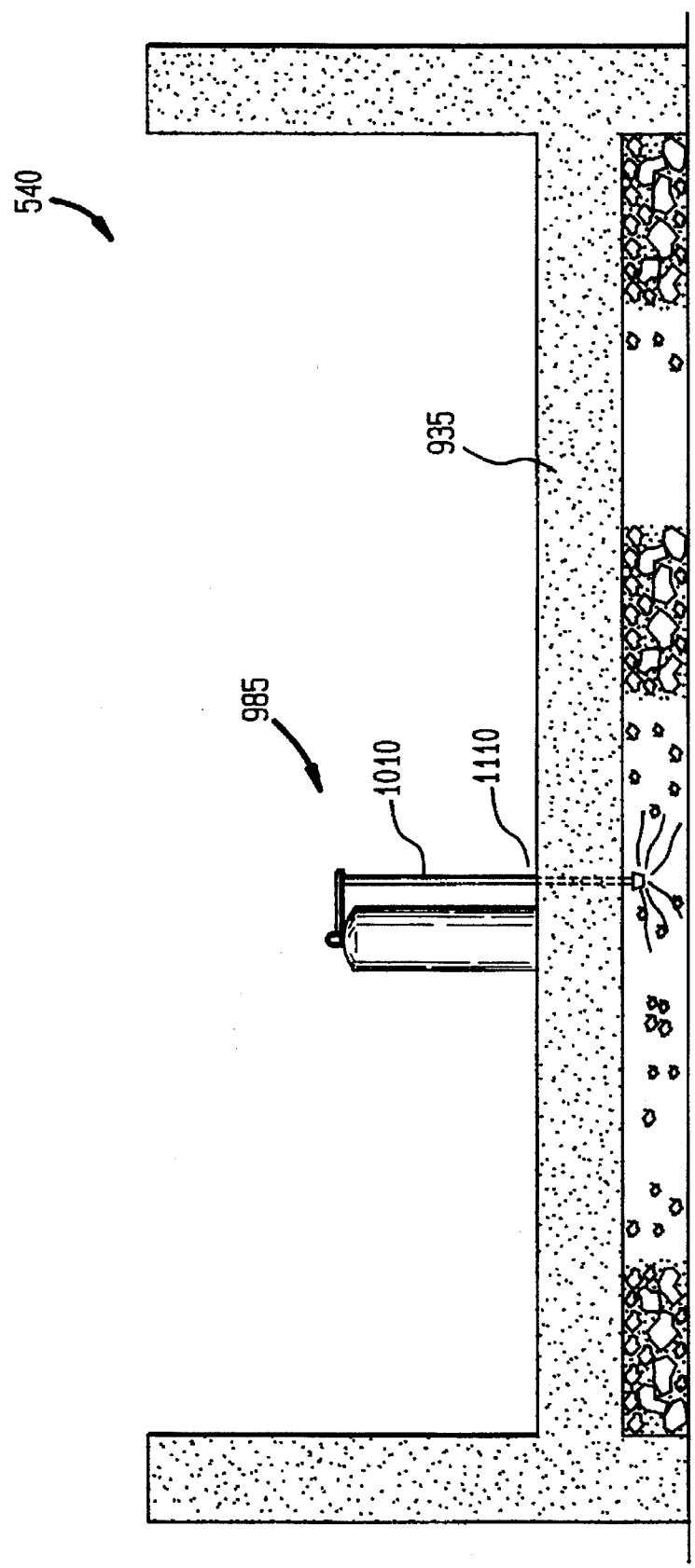
FIG. 11 illustrates a cross-sectional view of another embodiment of the vacuum breaker system.

FIG. 11 show an alternate embodiment of the a vacuum break system 985 where the pipe 1010 goes through a hole 1110 in the floor 935 of the floatable basement 540. The hole 1110 is sealed and water tight to prevent seepage of the floodwater when the basement 540 is floating. Because the hole 1110 may be a possible leakage point in the one piece floor 935, the embodiment shown in FIG. 10 of the vacuum break system 985 is preferred.

Figure 12:
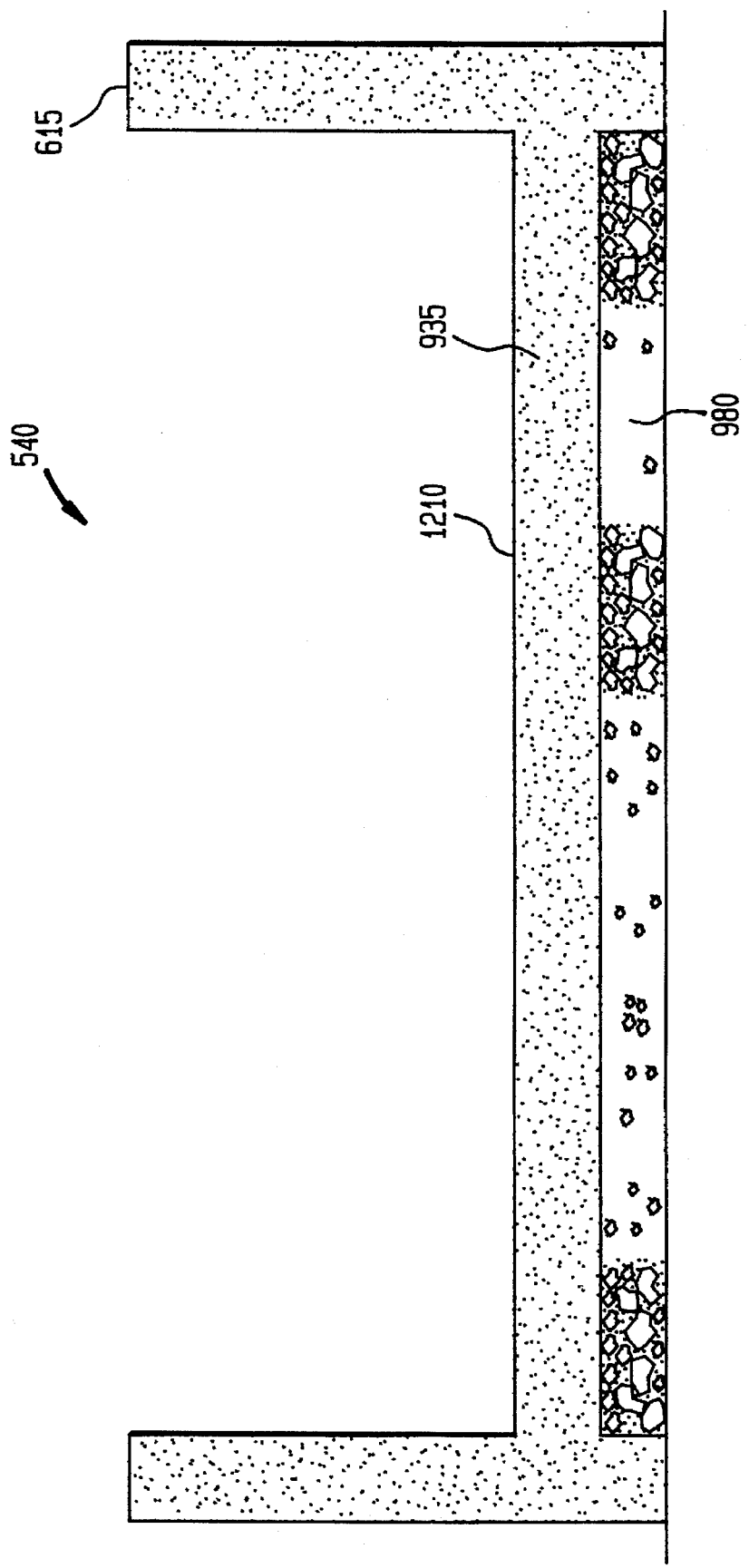
FIG. 12 illustrates a cross-sectional view of the watertight basement according to the invention.

The watertight basement 540, shown in FIG. 12, may be constructed in a manner similar to constructing a cement barge. In a dry construction site, the floatable basement 540 is made of standard cement, such as 3500 psi cement. For construction on a wet site, hydraulic cement is used which is chemically dried instead of being dried by air.

The watertight basement 540 may be constructed using a single pour of cement or a double pour. In the case of the watertight basement 540 constructed from a single pour, pre-manufactured sections of forms could be assembled together to form a mold for the walls 615 of the watertight basement 540. A plastic sheeting is spread preferably 6" above the shoulder stones 980 to form a floor mold. The plastic sheeting provides a smooth upper surface 1210 for the floor 935 of the watertight basement 540.

Next, cement is poured into the wall molds and the floor mold which is between the compacted shoulder stones 980 and the plastic sheeting. This results in forming a 6" floor 935 along with the walls 615 in one pour. Similar to the 6" thickness of the floor 935, the walls 615 are also 6" thick. However, different thickness of the walls 615 and the floor 935 may be constructed, depending on the soil characteristics and the size of the house structure 305 built on the watertight basement 540. Similarly, depending on soil and loading specifications, wire meshes or braces may be placed inside the molds and cement poured thereafter. This produces a watertight basement 540 having walls 615 and a floor 935 made from reinforced concrete. The single pour process results in a watertight basement 540 which is a unitary piece of concrete.

Figure 13B:
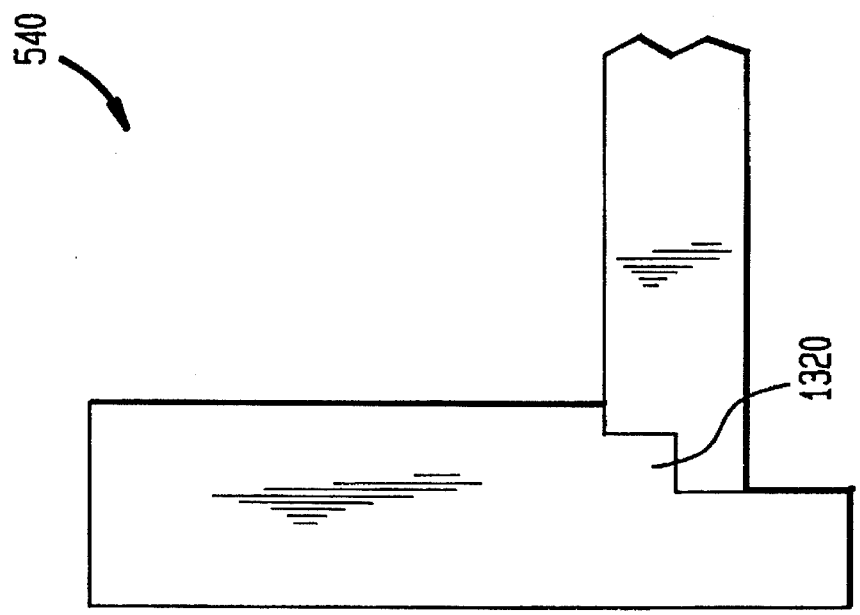
FIGS. 13a–13b illustrate a cross-sectional view of a wall and floor of the watertight basement having mating keyways.
Figure 13A:
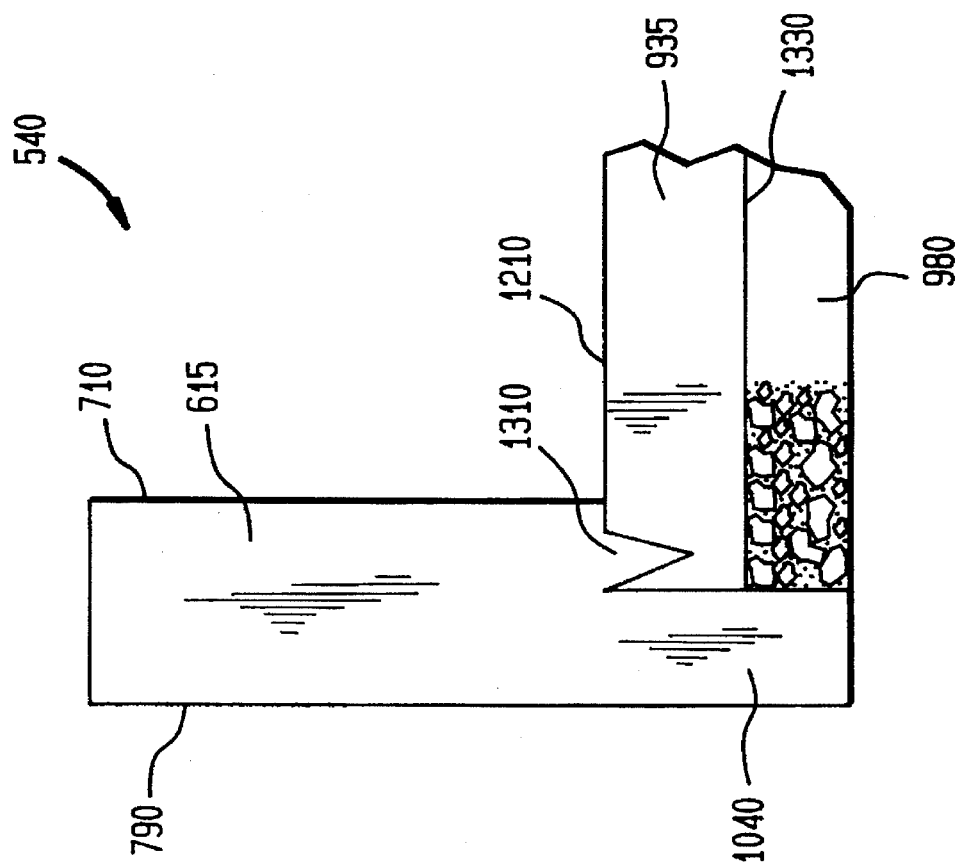

Alternatively, FIG. 13a–13b show the watertight basement 540 formed with two pours of cement. First, the floor 935 of the watertight basement 540 is formed with a keyway 1310 along the perimeter of the floor 935. The keyway 1310 mates with a corresponding keyway in the walls 615 to provide a watertight connection between the walls 615 and floor 935. The floor site is first framed to make a floor mold. The keyway 1310, which may have a v-shape or a rectangular shape (1320, FIG. 13b) is formed by placing a v-shaped strip or a 2"×4" stud around the perimeter of the floor site near the frame of the floor mold.

The top of the v-shaped strip (or the top of the 2"×4" stud) is flush with the top surface 1210 of the floor 935. This positions the keyway 1310 in the upper half of the floor 935. Thereafter, cement is poured. After the cement dries, the frame and the v-shaped strip (or the 2"×4" stud) are removed leaving a floor 935 having the keyway 1010 around the perimeter as shown in FIGS. 13a–13b.

Next, the wall frames are constructed to make a wall mold and cement poured therein to form the walls 615 of the watertight basement 540. The poured wall cement fills the keyway 1310 of the floor 935. This essentially forms the wall 615 having a keyway which mates with the keyway 1310 of the floor 935 and provides the watertight connection between the walls 615 and floor 935. The inner side 710 of the walls 615 extend over the floor 935 covering the keyway 1310. The outer side 790 of the walls 615 extends at least 4" below the lower surface 1330 of the floor 935 to form the retainer skirt 1040. The retainer skirt 1040 surrounds and retains the 3" to 4" thick shoulder stones 980 located below the floor 935.

Figure 14:
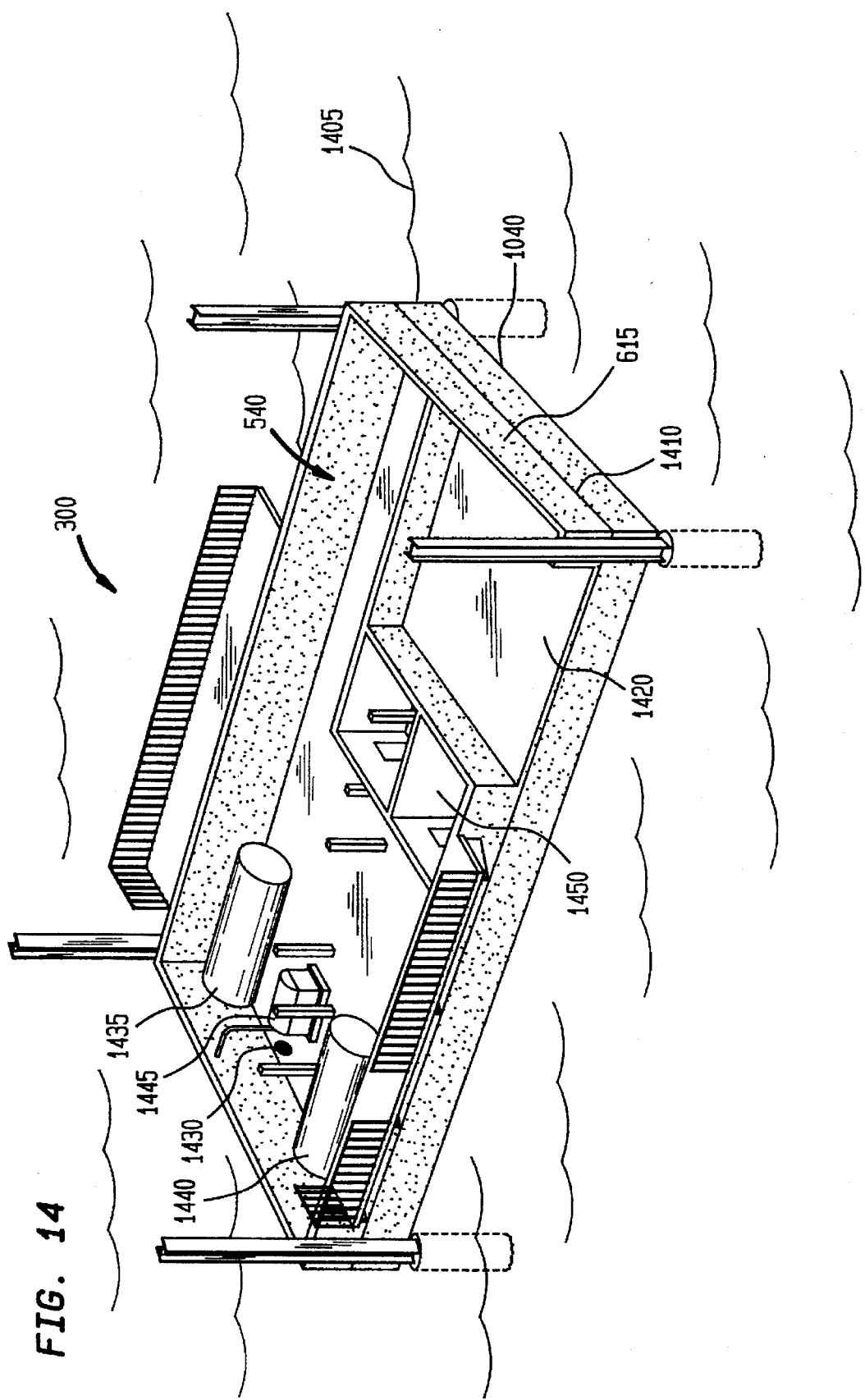
FIG. 14 illustrates an overhead view of the watertight basement showing a backup utility system according to the invention.

A backup utility system, shown in FIG. 14, renders the floatable house 300 self sufficient while it is floating on floodwater 1405 during an extended period of flooding. FIG. 14 shows a cutaway overhead view of the floatable house 300 floating on the floodwater 1405. The water line 1410 is between the retainer skirt 1040, which surrounds the lower portion of the wall 615 of the watertight basement 540, and the garage floor 1420.

The backup utility system is preferably located in the watertight basement 540 and includes a pump 1430, a 1000 gallon fresh water tank 1435, a 1000 gallon chemically treated sewer holding tank 1440 and a propane generator 1445 connected to a 200 lbs propane tank. Emergency supplies and food is stored in storage rooms 1450. When the floodwater 1405 begins to rise threatening to raise the watertight basement 540, the primary utility lines, such as electric, gas and plumbing lines, are manually disconnected and properly capped.

For example, the primary utility lines have a safe quick coupling for simple disconnection and reconnection. Alternatively, the quick coupling may be automated so as to self disconnect and self seal once a separating tension is applied due to the rising the watertight basement 540. The quick couplings of the primary utility lines and sewer lines may have certain flexibility for easier manipulation and for allowing a certain amount of movement in the watertight basement 540 before being disconnected. The sewer lines quick coupling is similar to a quick connect/disconnect coupling used on fire trucks for hookup to a fire hydrant.

In summary, a flotation system for a building has been described having a watertight basement with a wall roller and a ratchet located near each corner. When floodwater rises, the watertight basement with its rollers roll up the guide posts embedded in the caissons. A boost system is provided to negate a suction effect of the floodwater.

The ratchets allow the watertight basement to rise with the floodwater, but prevent it from lowering when the floodwater recedes. Lifting rods are also provided to raise the house, for example, to disengage the ratchet and allow the watertight basement to descend.

The watertight basement may be a unitary piece of concrete formed using a single pour of cement. Alternatively, two pours of cement are used, one pour for the floor of the watertight basement and a second pour for the walls. In this case, the floor and the walls have mating keyways that provide good mating and sealing. The floatable house has flexible quick disconnect couplings for safe and easy disconnection of primary utilities. For self sufficiency, the floating house has backup utilities.

The floatable house is reliable, stable and simple to construct. The floating house withstands tornados since it is confined between fixed guide posts and slides along them. The watertight basement also provides a tornado-proof concrete shelter. The floatable house being confined between fixed guide posts is much more stable than a house on telescopic extendible posts, especially when the house is raised or floating. The barge-like floating house confined between the guide posts floats evenly. This eliminates the need for leveling systems or shifting of the load distribution. Having hidden fixed guide posts greatly reduce maintenance and eliminates periodic greasing which is required for telescopic extendible posts.

Corrosion of the steel guide posts and lifting rods is minimized by reducing any exposed portions and galvanizing the exposed portions. The inventive floatable house does not require any special stabilizing elements, reinforcing steel rods or complex construction techniques. In addition, because of the watertight basement walls, skirts or coverings between the house structure and the ground are not needed.

Furthermore, the floatable house resembles an ordinary house. The floating house eliminates the need to built houses on an elevated foundation in flood prone areas and provides for a desirable basement without the fear of flooding the basement or the house. In addition, the watertight basement may be constructed next to an existing house, and the existing house moved and placed over the watertight basement. This transforms an existing ordinary house into a floatable house.

While the invention has been described by the reference to specific embodiments, this was for purposes of illustration only and should not be construed to limit the spirit or the scope of the invention. Numerous alternative embodiments may be devised by those skilled in the art without departing from the spirit and scope of the following claims.

The claimed invention is:

1. A flotation system for a building comprising:
   a watertight basement on which a building structure is mounted, said watertight basement having walls and a floor, said walls and floor comprising a foundation for said building structure, and
   a plurality of guide posts which guide a vertical movement of said watertight basement, said foundation and said building structure being caused to float by a rising floodwater.

2. The flotation system of claim 1, further comprising rollers attached to said watertight basement, wherein said rollers roll along said guide posts during said vertical movement of said watertight basement.

3. The flotation system of claim 2 wherein said rollers are rubber.

4. The flotation system of claim 1, wherein said watertight basement comprises a unitary piece of concrete forming said floor and said walls of said watertight basement.

5. The flotation system of claim 1, wherein said floor has a first keyway for mating with a second keyway of said walls so that a connection between said floor and said walls is watertight.

6. The flotation system of claim 1, wherein said guide posts are located near corners of said watertight basement.

7. The flotation system of claim 1, wherein said guide posts are steel H-beam posts.

8. The flotation system of claim 1, further comprising a plurality of lifting rods for lifting said building, wherein each of said lifting rods has a lower portion embedded in one of said walls and an upper portion located within walls of said building, and wherein said lower portion terminates in a base plate located within said floor, and wherein said upper portion extends through a roof of said building and terminates in a top plate, said top plate receiving a hook of a lifting device.

9. The flotation system of claim 1, further comprising a plurality of caissons wherein each of said caissons encloses a lower portion of said guide posts below said floating foundation.

10. The flotation system of claim 1, wherein an upper portion of said guide posts is enclosed within walls of said building.

11. The flotation system of claim 1 further comprising a vacuum break system for breaking a vacuum created under said floor of said watertight basement when said floodwater rises, said vacuum break system being located on said floor.

12. The flotation system of claim 11 wherein said vacuum break system is a $CO_2$ vacuum break system comprising:
   a container containing compressed $CO_2$,
   a valve connected said container,
   a pipe having one end connected to said valve, and a second end located below said floor, so that when said valve is opened said compressed $CO_2$ exits from said second end of said pipe and breaks said vacuum.

13. The flotation system of claim 12 wherein said vacuum break further comprises a nozzle connected to said second end of said pipe.

14. The flotation system of claim 1 further comprising a backup utility system located in said watertight basement, said backup utility system comprises a pump, a fresh water tank, a sewer holding tank, and a generator, wherein said backup utility system is connected to existing utility connections of said building after disconnecting a primary utility system coming from outside said building.

15. A flotation system for a building comprising:
   a watertight basement on which a building structure is mounted, said watertight basement having walls and a floor;
   a plurality of guide posts which guide a vertical movement of said watertight basement, said watertight basement and said building structure being caused to float by a rising floodwater; and
   a ratchet located near each corner of said watertight basement, said ratchet preventing lowering of said watertight basement after said floodwater recedes.

16. The flotation system of claim 15 further comprising a plurality of rollers, wherein each of said rollers is attached to said walls located near corners of said watertight basement.

17. The flotation system of claim 15 wherein each of said rollers is located above said ratchet.

18. The flotation system of claim 15 wherein each of said rollers is located adjacent said ratchet.

19. The flotation system of claim 15 wherein said ratchet comprises:

a first part connected to said guide post, said first part comprising a plurality of fixed teeth separated by a segment, and a second part connected to an outer surface of of a portion of said walls, wherein said portion is opposite said first part, said second part comprising a body connected to said outer surface, a movable tooth having a top end which is pivotally connected to said body, and a spring located between said movable tooth and said body, wherein said spring moves said movable tooth toward said first part.

20. The flotation system of claim 19 wherein said ratchet further comprises:

a rope, a handle, and a protrusion protruding from an inner surface of said wall, wherein said spring is coiled around said rope, said rope having a first end attached to said movable tooth, and a second end passing through a hole in said wall, said second end being located on an inner surface on said wall and terminating in said handle so that said movable tooth is pulled back and locked in a recessed position by pulling said handle and engaging said handle onto said protrusion.

21. The flotation system of claim 19 wherein said ratchet further comprises:

a rod having a first end attached to said movable tooth and wherein said spring is coiled around said rod, a rope having a first end attached to a second end of said rod, a handle, and a protrusion protruding from an inner surface of said wall, said rope having a second end passing through a hole in said wall, said second end of said rope being located on an inner surface on said wall and terminating in said handle so that said movable tooth is pulled back and locked in a recessed position by pulling said handle and engaging said handle onto said protrusion.

22. The flotation system of claim 19, wherein said ratchet further comprises a safety pin, and wherein said movable tooth has a hole for receiving said safety pin so that said movable tooth remains in a recessed position.

23. A flotation system for a building comprising:

a watertight basement on which a building structure is mounted, a plurality of guide posts which guide a vertical movement of said watertight basement, and a plurality of rollers connected to walls of said watertight basement, wherein each of said rollers rolls along one of said guide posts during said vertical movement of said watertight basement, said watertight basement being caused to float by a rising floodwater.

24. A flotation system for a building comprising:

a watertight basement on which a building structure is mounted, said watertight basement and said building structure mounted thereon being caused to float by a rising floodwater, a plurality of guide posts which guide a vertical movement of said watertight basement, and a plurality of ratchets wherein each of said ratchets is located between one of said guide posts and a wall of said watertight basement, said ratchet preventing lowering of said watertight basement.

25. A flotation system for a building comprising:

a watertight basement on which a building structure is mounted, said watertight basement having walls and a floor, a plurality of guideposts which guide a vertical movement of said watertight basement, said watertight basement and said building structure being caused to float by a rising floodwater, and a plurality of lifting rods for lifting said building, wherein each of said lifting rods has a lower portion embedded in one of said walls and an upper portion located within walls of said building structure, and wherein said lower portion terminates in a base plate located within said floor, and wherein said upper portion extends through a roof of said building and terminates in a top plate, said top plate receiving a hook of a lifting device.

26. A floatation system for a building comprising:

A watertight basement on which a building structure is mounted, said watertight basement having walls and a floor, a plurality of guideposts which guide a vertical movement of said watertight basement, said watertight basement and said building structure being caused to float by a rising floodwater, and a vacuum break system for breaking a vacuum created under said floor of said watertight basement when said floodwater rises, said vacuum break system being located on said floor.

27. A flotation system for a building comprising:

a watertight basement on which a building structure is mounted, said watertight basement having walls and a floor, said walls and floor comprising a foundation for said building structure, a plurality of guideposts which guide a vertical movement of said foundation, said watertight basement and said building structure being caused to float by a rising floodwater, and a backup utility system located in said watertight basement, said backup utility system comprising a pump, a fresh water tank, a sewer holding tank, and a generator, wherein said backup utility system is connected to existing utility connections of said building after disconnecting a primary utility system coming from outside said building.

* * * * *